(12) United States Patent
Eguchi

(10) Patent No.: US 12,556,642 B2
(45) Date of Patent: Feb. 17, 2026

(54) IMAGE PROCESSING APPARATUS WHICH CONVERTS COLOR IMAGES TO MONOCHROME WITH PERCEPTIBLE GRADATIONS IN GRAY VALUE, AND IMAGE PROCESSING METHOD AND STORAGE MEDIUM FOR SAME

(71) Applicant: CANON KABUSHIKI KAISHA, Tokyo (JP)

(72) Inventor: Kimimori Eguchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 18/399,530

(22) Filed: Dec. 28, 2023

(65) Prior Publication Data

US 2024/0244152 A1   Jul. 18, 2024

(30) Foreign Application Priority Data

Jan. 13, 2023   (JP) .................................. 2023-003732

(51) Int. Cl.
*H04N 1/40*   (2006.01)
*H04N 1/60*   (2006.01)

(52) U.S. Cl.
CPC ....... *H04N 1/40012* (2013.01); *H04N 1/6072* (2013.01)

(58) Field of Classification Search
CPC .......................... H04N 1/40012; H04N 1/6072
See application file for complete search history.

(56) References Cited

U.S. PATENT DOCUMENTS

| | | | |
|---|---|---|---|
| 2008/0259366 A1 | 10/2008 | Eguchi | G06F 15/00 |
| 2010/0238468 A1 | 9/2010 | Eguchi | G06K 9/00 |
| 2018/0124285 A1 | 5/2018 | Eguchi | H04N 1/60 |
| 2019/0045087 A1 | 2/2019 | Shimamura et al. | H04N 1/60 |
| 2020/0177764 A1* | 6/2020 | Sugahara | H04N 1/40012 |
| 2020/0322503 A1* | 10/2020 | Eguchi | H04N 1/6008 |
| 2021/0319274 A1* | 10/2021 | Eguchi | G06K 15/1826 |
| 2022/0070333 A1* | 3/2022 | Inoue | H04N 1/4092 |
| 2023/0224421 A1* | 7/2023 | Shinya | H04N 1/40012 358/3.01 |

FOREIGN PATENT DOCUMENTS

JP   2017-038242   2/2017

* cited by examiner

*Primary Examiner* — Nicholas Pachol
(74) *Attorney, Agent, or Firm* — Venable LLP

(57) ABSTRACT

In a case where a plurality of colors is included in the color image, the modification unit calculates a gray value difference indicating a difference between two adjacent gray values for a plurality of the gray values corresponding to the plurality of colors and arranged in order from the largest gray value, in a case where the calculated gray value difference is smaller than a threshold value, changes the corresponding gray value so that the gray value difference becomes the same value as the threshold value, and in a case where the calculated gray value difference is larger than the threshold value, changes the corresponding gray value so that the gray value difference becomes small in accordance with the magnitude of the gray value difference.

16 Claims, 10 Drawing Sheets

FIG.3A

- Sheet size: A4
- Imposition: single-sided
- Color mode: monochrome
  - 301
  - monochrome
  - color
  - automatic (color/monochrome)
- Print / Cancel

FIG.3B

- Sheet size: A4
- Imposition: single-sided
- Color mode: monochrome
- Color data processing at the time of monochrome: not perform
  - 311
  - not perform
  - density adjustment
  - boundary emphasis
- Print / Cancel

| ID | R | G | B | Gray |
|----|-----|-----|-----|------|
| 0 | 255 | 255 | 255 | 255 |
| 1 | 255 | 100 | 100 | 146 |
| 2 | 200 | 96 | 255 | 145 |
| 3 | 144 | 144 | 144 | 144 |
| 4 | 112 | 173 | 71 | 143 |
| 5 | 91 | 155 | 213 | 142 |
| 6 | 220 | 120 | 40 | 141 |
| 7 | 0 | 0 | 0 | 0 |

FIG.6A

| ID | R | G | B | Gray |
|----|-----|-----|-----|------|
| 0 | 255 | 255 | 255 | 255 |
| 1 | 255 | 100 | 100 | 178 |
| 2 | 200 | 96 | 255 | 162 |
| 3 | 144 | 144 | 144 | 146 |
| 4 | 112 | 173 | 71 | 130 |
| 5 | 91 | 155 | 213 | 114 |
| 6 | 220 | 120 | 40 | 98 |
| 7 | 0 | 0 | 0 | 0 |

FIG.6B

| ID | R | G | B | Gray |
|----|-----|-----|-----|------|
| 0 | 255 | 255 | 255 | 255 |
| 1 | 255 | 193 | 255 | 220 |
| 2 | 255 | 193 | 255 | 219 |
| 3 | 218 | 218 | 218 | 218 |
| 4 | 165 | 255 | 160 | 217 |
| 5 | 125 | 255 | 255 | 216 |
| 6 | 255 | 200 | 185 | 215 |
| 7 | 0 | 0 | 0 | 0 |

FIG.6C

| ID | R | G | B | Gray |
|----|-----|-----|-----|------|
| 0 | 255 | 255 | 255 | 255 |
| 1 | 255 | 193 | 255 | 220 |
| 2 | 255 | 193 | 255 | 204 |
| 3 | 218 | 218 | 218 | 188 |
| 4 | 165 | 255 | 160 | 172 |
| 5 | 125 | 255 | 255 | 156 |
| 6 | 255 | 200 | 185 | 140 |
| 7 | 0 | 0 | 0 | 0 |

FIG.6D

IMAGE PROCESSING APPARATUS WHICH CONVERTS COLOR IMAGES TO MONOCHROME WITH PERCEPTIBLE GRADATIONS IN GRAY VALUE, AND IMAGE PROCESSING METHOD AND STORAGE MEDIUM FOR SAME

BACKGROUND

Field

The present disclosure relates to an image processing technique in a case where a full-color document is printed in monochrome.

Description of the Related Art

In a general office, a document, such as a material for presentation created by using a document creation application or the like, is normally created in full color. However, cases are not few where even though a document image is created in full color, the document image is printed in monochrome (black monochrome). In the case such as this where a full-color document image (in the following, described as "color image") is printed in monochrome, grayscale conversion processing to convert color values a color image has into monochrome is necessary. Here, for example, in a case where a color image having color values in the RGB color space is printed in monochrome, processing to convert RGB values into gray values representing luminance is performed by performing the weighting computing by, for example, the NTSC weighted average method for the RGB values. At this time, in a case where colors whose RGB values are quite different from each other in a color image are converted into the same or similar gray values, the color discrimination the color image has is reduced in the grayscale image. Then, the problem of the reduction in the color discrimination may occur in another grayscale conversion method, such as sRGB and RGB uniform. In this regard, Japanese Patent Laid-Open No. 2017-38242 has disclosed a technique to use a conversion table that makes converted gray values separate from one another in a case where the number of colors used within a color image is less than or equal to a predetermined number.

With the technique of Japanese Patent Laid-Open No. 2017-38242 described above, conversion is performed so that the difference between adjacent gray values in the grayscale image is constant irrespective of the original RGB values. Here, for example, it is assumed that the original color image is configured only by a plurality of pale chromatic colors or only by a plurality of dark chromatic colors. In this case, the gray values are assigned so as to be arranged uniformly side by side at intervals obtained by dividing the range between "0 (black)" and "255 (white)" by the number of colors. However, in this case, it may happen that a gray value representing a dark color is assigned to a color that is originally a pale color because of the relationship with other colors, or in contrast to this, a gray value representing a pale color is assigned to a color that is originally a dark color because of the relationship with other colors. Because of this, though discrimination is improved in the converted grayscale image, there is a case where the impression changes considerably from that of the original color image.

SUMMARY

The image processing according to the present disclosure is an image processing apparatus for printing a color image in monochrome and includes: a conversion unit configured to convert a multidimensional color component value identifying a color included in the color image into a gray value; and a modification unit configured to modify the gray value obtained by the conversion unit, wherein in a case where a plurality of colors is included in the color image, the modification unit: calculates a gray value difference indicating a difference between two adjacent gray values for a plurality of the gray values corresponding to the plurality of colors and arranged in order from the largest gray value; in a case where the calculated gray value difference is smaller than a threshold value, changes the corresponding gray value so that the gray value difference becomes the same value as the threshold value; and in a case where the calculated gray value difference is larger than the threshold value, changes the corresponding gray value so that the gray value difference becomes small in accordance with the magnitude of the gray value difference.

Further features of the present disclosure will become apparent from the following description of exemplary embodiments with reference to the attached drawings.

BRIEF DESCRIPTION OF THE DRAWINGS

FIG. 3A and FIG. 3B are each a diagram showing one example of a UI screen of a printer driver;

FIG. 6A to FIG. 6D are each a diagram showing one example of a color value list;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Configuration of Printing System>

Figure 1:
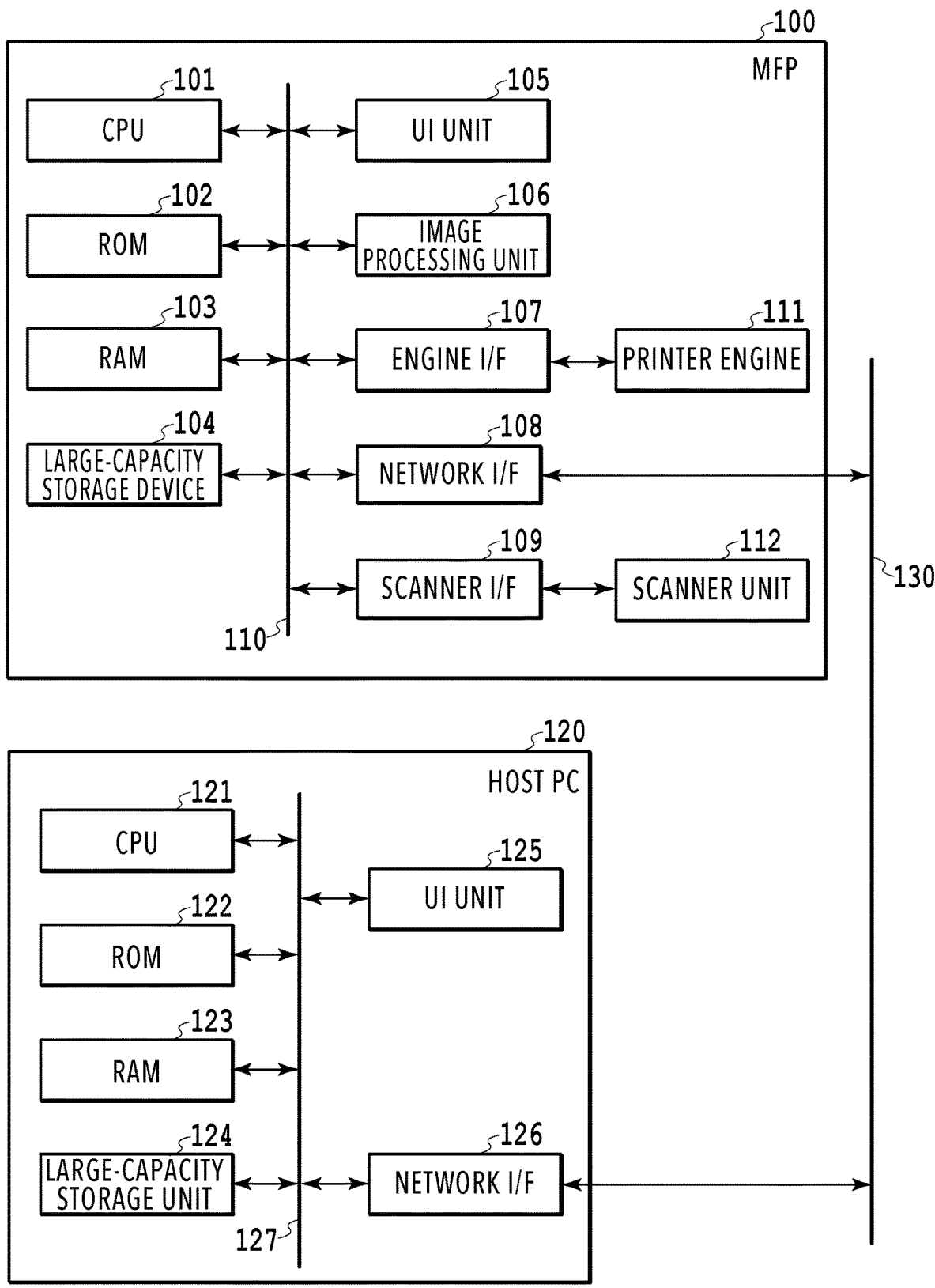
FIG. 1 is a block diagram showing one example of a hardware configuration of a printing system.

FIG. 1 a block diagram showing one example of a hardware configuration of a printing system according to the present embodiment. The printing system includes an MFP 100 as an image forming apparatus and a host PC 120 as an information processing apparatus and the MFP 100 and the host PC 120 are connected to each other via a network 130, such as a LAN.

<<Hardware Configuration of MFP>>

The MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. The image processing unit 106 may be configured as an image processing apparatus (image processing controller) independent of the MFP 100.

The CPU 101 controls the operation of the whole MFP 100. The CPU 101 performs various types of processing, to be described later, by reading programs stored in the ROM 102 onto the RAM 103 and executing the programs. The ROM 102 is a read only memory and in the ROM 102, system activation programs or programs for controlling the printer engine, and character data, character code information or the like are stored. The RAM 103 is a volatile random access memory and used as a work area of the CPU 101 and as a temporary storage area of various types of data. For example, the RAM 103 is used as a storage area for storing font data additionally registered by download, image files received from an external device, and the like. The large-capacity storage device 104 is, for example, an HDD and an SSD and in which various types of data are spooled and is used for storage of programs, various tables, information files, image data and the like and used as a work area.

The UI (User Interface) unit 105 includes, for example, a liquid crystal display (LCD) comprising a touch panel function and displays a screen for notifying a user of the setting state of the MFP 100, the situation of processing being performed, the error state and the like. Further, the UI unit 105 receives various user instructions, such as instructions to input various setting values of the MFP 100 and instructions to select various buttons, via a predetermined user interface screen (GUI). It may also be possible for the UI unit 105 to separately comprise an input device, such as a hard key.

The image processing unit 106 analyzes drawing data described in PDL (in the following, called "PDL data") that is input from the host PC 120 via the network 130 and generates print image data that can be processed by the printer engine 111. PDL is an abbreviation of Page Description Language. Further, the image processing unit 106 performs predetermined image processing also at the time of transmitting image data stored by the BOX function to an external device. Details of the image processing unit 106 will be described later.

The engine I/F 107 is an interface for controlling the printer engine 111 in accordance with instructions from the CPU 101 at the time of performing printing. Via the engine I/F 107, engine control commands and the like are transmitted and received between the CPU 101 and the printer engine 111. The network I/F 108 is an interface for connecting the MFP 100 to the network 130. The network 130 may be, for example, a LAN or a public switched telephone network (PSTN). The printer engine 111 forms a multicolor image on a printing medium, such as paper, by using color materials (here, toner) of a plurality of colors (here, four colors of CMYK) based on print image data provided from the image processing unit 106. The scanner I/F 109 functions as an interface for controlling the scanner unit 112 in accordance with instructions from the CPU 101 at the time of reading a document by the scanner unit 112. Via the scanner I/F 109, scanner unit control commands and the like are transmitted and received between the CPU 101 and the scanner unit 112. The scanner unit 112 generates image data (scanned image data) by optically reading a document under the control of the CPU 101 and transmits the image data to the RAM 103 or the large-capacity storage device 104 via the scanner I/F 109.

<<Hardware Configuration of Host PC>>

The host PC 120 comprises a CPU 121, a ROM 122, a RAM 123, a large-capacity storage device 124, a UI unit 125, and a network I/F 126. Each of these units is connected to one another via a system bus 127. The CPU 121 is a processor that controls the operation of the whole host PC 120 and performs various types of processing by reading control programs and application programs stored in the ROM 122. The RAM 123 is used as a temporary storage area, such as a main memory and a work area, of the CPU 121. The large-capacity storage device 124 is, for example, an HDD and an SSD, and stores image data and the like, in addition to various programs, such as a printer driver. The UI (User Interface) unit 125 includes, for example, a liquid crystal monitor, a keyboard and the like and is used to display various GUIs and receive user instructions. The network I/F 126 is an interface that connects the host PC 120 to the network 130. The host PC 120 transmits the PDL data generated by using the installed printer driver to the MFP 100 via the network I/F 126 and causes the MFP 100 to perform print processing. Further, the host PC 120 receives the image data transmitted from the MFP 100 via the network I/F 126 and edits, displays the image data, and so on.

<Function Configuration of Printing System>

Figure 2:
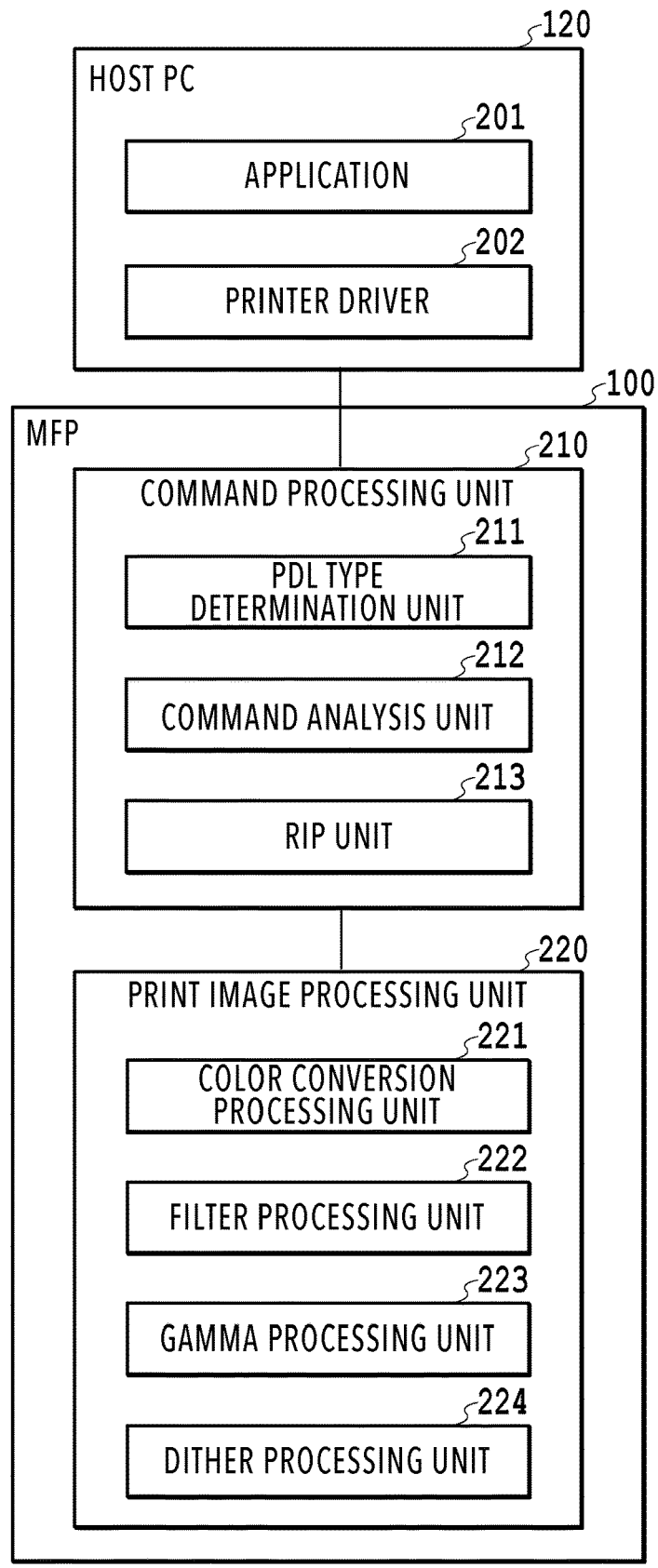
FIG. 2 is a block diagram showing one example of a software configuration relating to the print function of a host PC and an MFP.

FIG. 2 is a block diagram showing one example of the software configuration relating to the print function of the host PC 120 and the MFP 100. By using FIG. 2, the outline of the printing system according to the present embodiment is explained.

The host PC 120 has an application 201 and a printer driver 202. A user creates document data, such as a presentation material, by using the application 201 installed in the host PC 120. Then, the user generates print instruction data (generally called "print job") of the document data by using the printer driver 202. In the print job, contents to be printed in accordance with the object attribute, such as text, graphics, and image, are predefined for each page by page description language (PDL). The generated print job is sent to the MFP 100. The series of processing is implemented by the CPU 121 loading a program stored in the ROM 122 of the host PC 120 onto the RAM 123 and executing the program.

The MFP 100 has a command processing unit 210 and a print image processing unit 220 corresponding to the image processing unit 106 described previously. The print job received from the host PC 120 is analyzed in the command processing unit 210 and image data in the raster format is generated. Then, in the print image processing unit 220, predetermined image processing is performed for the raster image and print image data is generated. The generated print image data is sent to the printer engine 111 and printed and output. The series of processing is implemented by the CPU 101 loading a program stored in the ROM 102 of the MFP 100 onto the RAM 103 and executing the program.

<Details of Function Configuration of MFP>

The print job received from the host PC 120 is input to the command processing unit 210. The command processing unit 210 includes a PDL type determination unit 211, a command analysis unit 212, and a RIP unit 213.

<<Command Processing Unit>>

The PDL type determination unit 211 determines the type of PDL used in the print job. As the types of PDL, for example, there are PostScript (PS), PrinterCommandLanguage (PCL) and the like. The command analysis unit 212 extracts a command in accordance with the PDL type identified by the PDL type determination unit 211 from the print job and analyzes the contents to be printed. Here, as the commands, there are a control command a drawing command.

The control command is a command to designate printing conditions and the like. For example, information on the sheet size, imposition, and color mode designated by a user via a UI screen 300 of the printer driver 202 as shown in FIG. 3A is included in the control command. In a case of the UI screen 300, a user selects a desired color mode from three types of color mode, that is, "monochrome", "color", and "automatic (color/monochrome)". Then, in a case where, for example, "monochrome" is selected from a pulldown menu 301 of Color mode, following this, a user performs selection of whether to perform discrimination improvement processing. Specifically, on a UI screen 310 after the screen transition, a user selects one from the three types of "not perform", "density adjustment", and "boundary emphasis" from a pulldown menu 311 of Color data processing at the time of monochrome. Here, in a case where "not perform" is selected, a print job is generated in which the color of each object within the page is designated by a one-dimensional gray value (each of RGB has the same value). On the other hand, in a case where "density adjustment" or "boundary emphasis" is selected from the pulldown menu 311, as in the case where "color" is selected as Color mode, a print job is generated in which the color of each object is designated by three-dimensional RGB values. That is, in the present embodiment, in a case where "density adjustment" or "boundary emphasis" is designated at the time of monochrome printing, the same print job as that at the time of color printing is generated and grayscale conversion is performed in the image forming apparatus 100. The color of each object in the print job at the time of color printing and at the time of monochrome printing with the discrimination improvement processing is only required to be designated by a multidimensional color component value corresponding to a predetermined color space and not limited to RGB values.

Figure 4A:
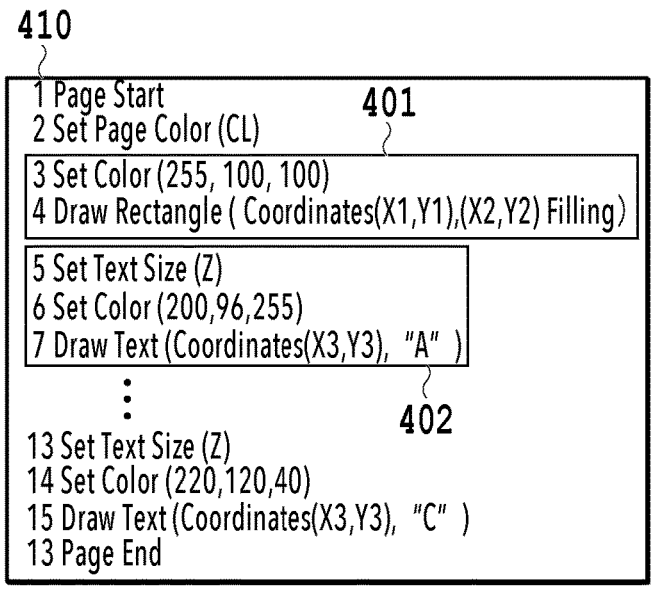
FIG. 4A is a diagram showing one example of a drawing command group.

As the drawing commands, there are a color mode setting command to set the color mode of a job and a color setting mode to set a color. Further, there are a graphic drawing command to draw a graphic object, a character drawing command to draw a character object, a size setting command to set the character size of a character object, and a font setting command to set the font of a character object. In addition to those described above, a command to set coordinates and the thickness of a line, a command to draw an image, and the like are also included. FIG. 4A is a diagram showing one example of a drawing command group corresponding to the image of one page (page image). Here, the example is premised on a color page image in which each pixel has 8-bit RGB values. The third command "Set Color (255, 100, 100)" in the drawing command group shown in FIG. 4A indicates that vermilion whose RGB values are R=255, G=100, and B=100 is set. Then, the fourth command "Draw Rectangle (Coordinates (X1, Y1), Coordinates (X2, Y2), Filling) indicates that a rectangular object identified by the top-left coordinates (X1, Y1) and the bottom-right coordinates (X2, Y2) is drawn. Further, the fifth command "Set Text Size (Z)" designates the character size and the sixth command "Set Color (200, 96, 255)" designates the color of the character as purple whose R=200, G=96, and B=255. Then, the seventh command "Draw Text (Coordinates (X3, Y3), "A")" designates to draw an alphabet uppercase letter "A" at the coordinates (X3, Y3).

Figure 4B:
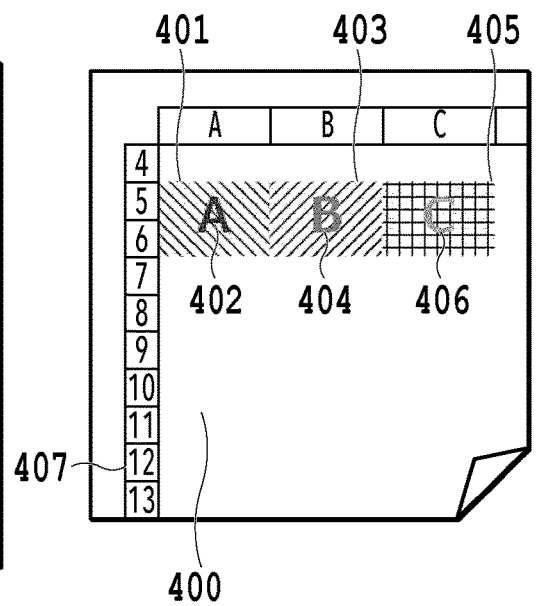
FIG. 4B is a diagram showing one example of a raster image.

The RIP unit 213 generates a raster image in which each pixel has RGB vales in a case of color printing or a raster image in which each pixel has a gray value in a case of monochrome printing by performing drawing processing based on the analysis results of the command analysis unit 212. FIG. 4B shows a raster image corresponding to one page, which is generated in accordance with the drawing command group in FIG. 4A described above. In the raster image in FIG. 4B, a rectangle 401 indicated by backward slants is a vermilion rectangular graphics object drawn by the third and fourth commands in the drawing command group in FIG. 4A. Further, an alphabet uppercase letter "A" 402 formed inside the rectangle 401 is a purple text object drawn by the fifth to seventh commands in the drawing command group in FIG. 4A. Then, although no corresponding command is shown in FIG. 4A, a rectangle 403 indicated by forward slants in the raster image in FIG. 4B is a rectangular graphics object drawn in gray whose (R, G, B)=(144, 144, 144). An alphabet uppercase letter "B" 404 formed inside the rectangle 403 is a text object drawn in yellowish green whose (R, G, B)=(112, 173, 71). Further, although no corresponding command is shown in FIG. 4A, a rectangle 405 indicated by grids in the raster image in FIG. 4B is a rectangular graphics object drawn in light blue whose (R, G, B)=(91, 155, 213). An alphabet uppercase letter "C" 406 formed inside the rectangle 405 is a text object drawn in orange whose (R, G, B)=(220, 120, 40). A background 400 is white whose (R, G, B)=(255, 255, 255) and a ruled line 407 is drawn in black whose (R, G, B)=(0, 0, 0). The RIP unit 213 also generates attribute information indicating the attribute of an object included in the raster image for each pixel in a case of generating the raster image. The generated raster image and attribute information are sent to the print image processing unit 220.

<<Print Image Processing Unit>>

The print image processing unit 220 includes a color conversion processing unit 221, a filter processing unit 222, a gamma processing unit 223, and a dither processing unit 224. In the following, each unit within the print image processing unit 220 is explained.

The color conversion processing unit 221 converts the color values of each pixel into CMYK values in accordance with the color materials used in the printer engine 111 by performing color conversion processing for the raster image generated by the RIP unit 213.

The filter processing unit 222 performs filter processing, such as sharpness processing, for the raster image for which color conversion processing has been performed by the color conversion processing unit 221 and in which each pixel has CMYK values. It may also be possible to obtain a raster image in which each pixel has CMYK values by performing color conversion processing after performing filter processing for the raster image generated by the RIP unit 213.

The gamma processing unit 223 performs gamma correction processing for implementing the smooth tone characteristics in accordance with the color reproduction characteristics of the printer engine 111 for the raster image for which filter processing has been performed. For this gamma correction processing, normally, a one-dimensional LUT (lookup table) is used.

The dither processing unit 224 generates a halftone image representing each pixel by a halftone by performing dither processing for the raster image for which gamma correction processing has been performed. The data of the generated halftone image is sent to the printer engine 111 as print image data.

<Details of Grayscale Conversion Processing>

Figure 5:
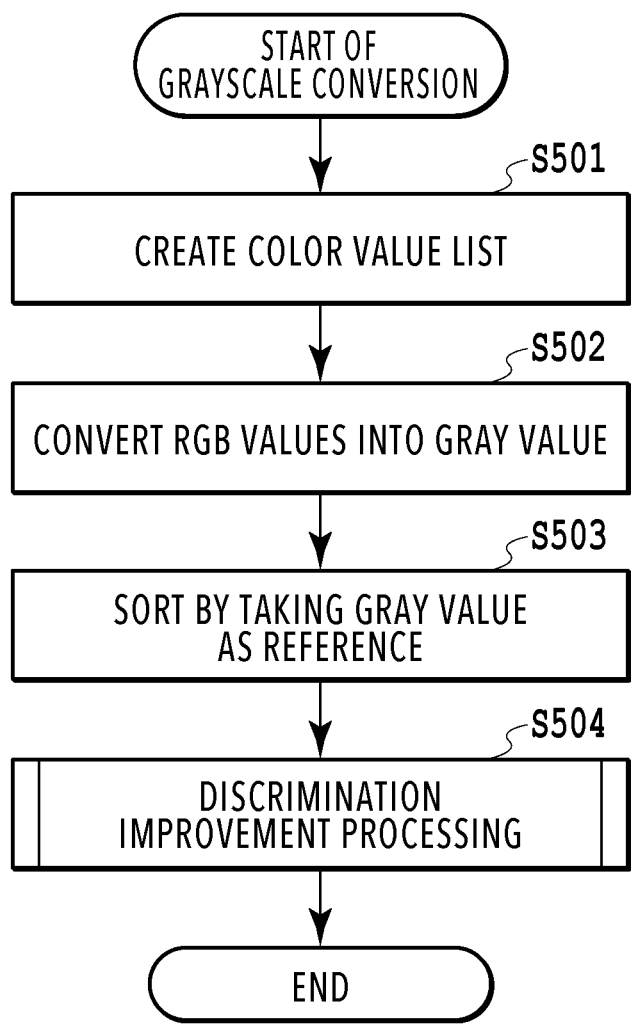
FIG. 5 is a flowchart showing a flow of grayscale conversion processing.

Next, the grayscale conversion processing to convert a color image into a monochrome image in the command analysis unit 212 is explained. In the present embodiment, the grayscale conversion processing not losing the impression of the original color image while improving discrimination in the converted gray value is implemented. FIG. 5 is a flowchart showing a rough flow of the grayscale conversion processing according to the present embodiment. In the following explanation, a symbol "S" means a step.

At S501, based on the drawing command included in the input print job, a color value list of the printing-target page is created. Specifically, processing to extract the color values (RGB values) designated in the color setting command and add the extracted color values to the list in association with each object is performed.

At S502, primary conversion processing to convert the RGB values of each record in the color value list created at S501 into a gray value is performed. In this primary conversion processing, for example, the NTSC weighted average method is used. Specifically, conversion by weighting computing using formula (1) below is performed.

$$\text{Gray} = 0.299R + 0.587G + 0.114B \qquad \text{formula (1)}$$

In formula (1) described above, R represents red, G represents green, and B represents blue and the gray value obtained by the above-described weighting computing is stored in the color value list. The method that is used for the primary conversion processing may be another method, for example, such as sRGB or RGB uniform expressed by formula (2) or formula (3) below.

$$sRGB: \text{Gray} = 0.21R + 0.72G + 0.07B \qquad \text{formula (2)}$$

$$RGB \text{ uniform: } \text{Gray} = (R + G + B)/3 \qquad \text{formula (3)}$$

At S503, the records included in the color value list are sorted by taking the gray value as a reference. In the present embodiment, records are sorted in the descending order so that the gray values for each object are arranged in order from the largest gray value. FIG. 6A shows one example of the color value list generated based on the drawing command group in FIG. 4A described previously, which is obtained by the processing up to this point, and "255" represents white and "0" represents black. In the color value list in FIG. 6A, IDs "0" to "7" for identifying each color correspond to each of the background 400, the three rectangles 401, 403, and 405, the three alphabet letters 402, 404, and 406, and the ruled line 407, respectively in the raster image in FIG. 4B described previously. The generated color value list is stored in the RAM 107. At this timing, the sort processing is not indispensable and it may also be possible to perform the sort processing in discrimination improvement processing, to be described later, specifically, before starting S703 in the flowchart in FIG. 7.

At S504, secondary conversion processing (discrimination improvement processing) to improve the discrimination of the colors in the grayscale image by modifying each gray value included in the color value list obtained by the processing at S501 to S503 as needed is performed. Here, with reference to the flowchart in FIG. 7, the discrimination improvement processing according to the present embodiment is explained in detail.

<Discrimination Improvement Processing>

Figure 7:
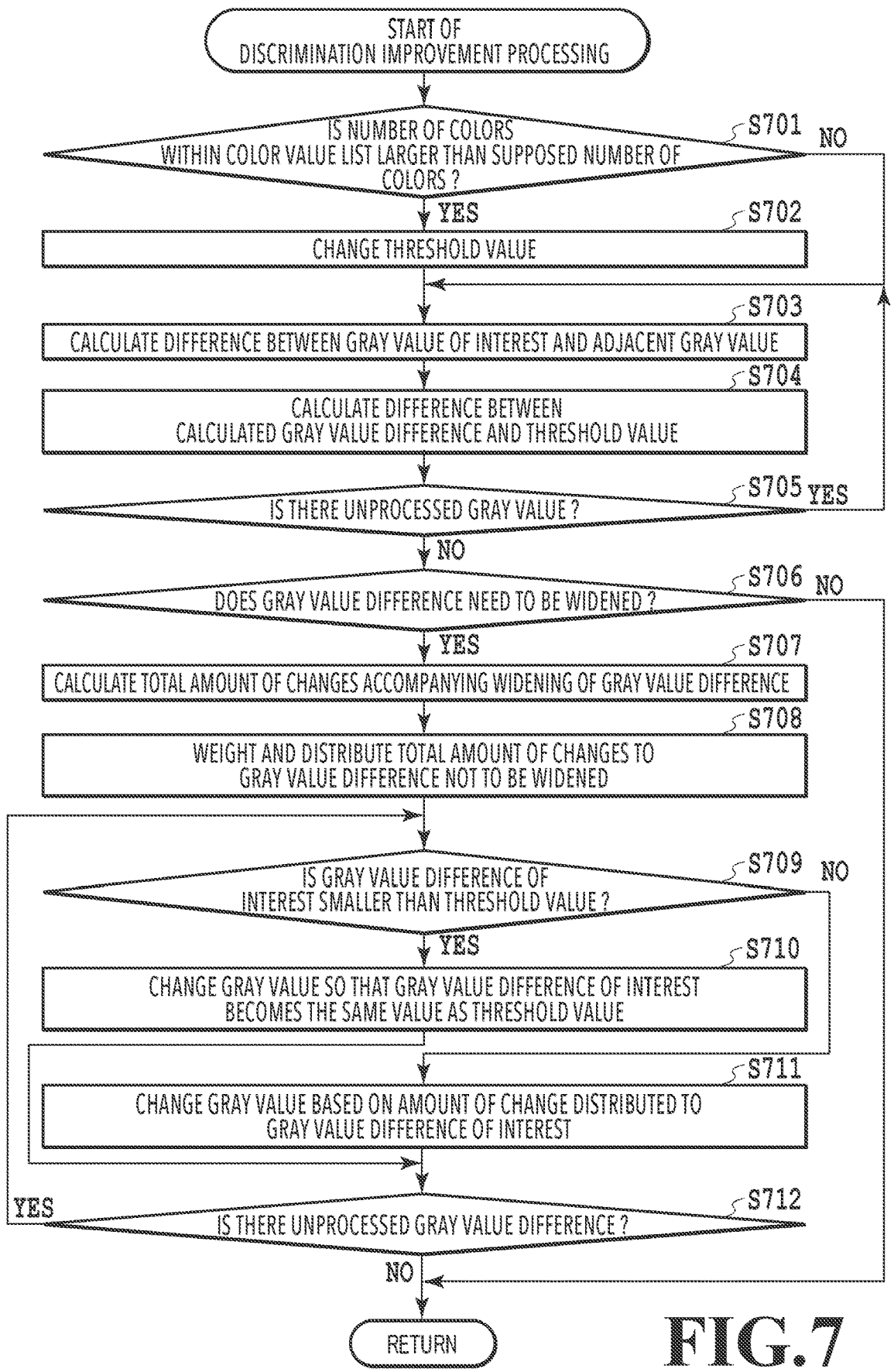
FIG. 7 is a flowchart showing details of discrimination improvement processing.

In the discrimination improvement processing, discrimination is improved by modifying the difference between adjacent gray values for the gray value group within the color value list. In details, a gray value difference (threshold value) that can be discriminated is defined in advance and the portion at which the gray value difference is smaller than the threshold value is modified so that the gray value difference becomes the same as the threshold value and the portion at which the gray value difference is larger than the threshold value is modified so that the gray value difference becomes small in accordance with the magnitude of the gray value difference. FIG. 7 is a flowchart showing details of the discrimination improvement processing according to the present embodiment. In the following, explanation is given along the flowchart in FIG. 7 by taking a case as an example where the discrimination improvement processing is applied to the color value list shown in FIG. 6A described previously. In the following explanation, a symbol "S" means a step.

At S701, with reference to the ID of the processing-target color value list, whether or not the number of colors within the color value list is larger than a supposed number of colors is determined. Here, the number of colors within the color value list is the same as the number of colors included in the printing-target image. Further, the supposed number of colors means the number of colors that can be discriminated in a case where the gray value difference (=threshold value) necessary for discriminating each gray value after the grayscale conversion is set and expressed by formula (4) below.

$$\text{supposed number of colors} = \qquad \text{formula (4)}$$
$$(\text{number of tones that can be represented/threshold value}) + 1$$

For example, in a case where the number of tones that can be represented is 256 and the threshold value is 16, by formula (4) described above, the supposed number of colors is 17. Then, this means that in a case where the number of colors within the color value list is in the range between 3 and 17 including white (R=255, G=255, G=255) and black (R=0, G=0, B=0), it is possible to widen the portion at which the gray value difference is less than threshold value to "16". In a case where the results of the determination indicate that the number of colors within the color value list is larger than the supposed number of colors, the processing advances to S702 and in a case where the number of colors within the color value list is less than the supposed number of colors, the processing advances to S703.

At S702, the threshold value is changed. The changed threshold value is found by formula (5) below.

$$\text{changed threshold value} = \qquad \text{formula (5)}$$
$$256/(\text{number of colors within color value list} - 1)$$

The reason the threshold value is changed by formula (5) described above is as follows. For example, in a case where each pixel has an 8-bit gray value, although depending on the performance of the printer engine 111 of the MFP 100, it is assumed that discrimination is possible on a condition that there is a difference of "16" between tones among 256 tones from "0 to 255". In this case, the threshold value is set to "16" and on a condition that the difference between adjacent gray values of the plurality of gray values within the color value list is smaller than the threshold value, it is possible to improve discrimination by widening the difference to the threshold value. However, in a case where the number of colors within the color value list is larger than 17, the number of intervals between colors becomes larger than 16. As a result of that, in a case where the gray value difference smaller than the threshold value is widened to the threshold value with the threshold value still being set to "16", the gray values are no longer included within the range of 256 tones, which is the number of tones the printer engine 111 can represent. Consequently, in a case where the number of colors within the color value list is larger than the supposed number of colors, the threshold value is changed to a smaller threshold value in accordance with the number of colors within the color value list so that the gray values are included within the range of 256 tones. For example, in a case where the number of colors within the color value list is 33, the number of intervals in the 256 tones is 32, and therefore, the threshold value is changed to 256/32=8. In this case, the discrimination aimed at initially is not implemented, but it is possible to improve discrimination compared to the conventional grayscale conversion processing.

At S703, the difference between the gray value of interest among the sorted gray values stored in the color value list and the next gray value (adjacent gray value) is calculated. In this case, it is sufficient to determine the gray value of interest in order from the uppermost gray value in the color value list. For example, in the color value list in FIG. 6A, the difference between the gray value "255" whose ID=0, which is the uppermost record, and the next gray value "146" whose ID=1 is 255−146=109. Further, in the color value list in FIG. 6A, the difference between the gray value "146" whose ID=1, which is the second record, and the gray value "145" whose ID=2, which is the record next to the second record, is 146−145=1. The gray value difference thus calculated is associated with the two calculation-target adjacent gray values (that is, the gray value of interest and the adjacent gray value) and stored in the RAM 103.

At S704, the difference between the gray value difference calculated at S703 and the threshold value set in advance is calculated. For example, in a case where the threshold value set in advance is "16", the difference between the gray value difference "109" and the threshold value is 109−16=+93 and the difference between the gray value difference "1" and the threshold value is 1−16=−15. The "difference between gray value difference and threshold value" thus obtained is associated with the calculation-target gray value difference and stored in the RAM 103.

At S705, whether or not there is an unprocessed gray value within the color value list is determined. In a case where all the differences between the gray value difference and the threshold value are calculated by taking all the gray values within the color value list as the target, the processing advances to S706. On the other hand, in a case where there remains a gray value not processed yet as the gray value of interest within the color value list, the processing returns to S703, and the next gray value of interest is determined and the processing is continued. For the lowermost record within the color value list (in the example in FIG. 6A, the smallest gray value "0"), it is not necessary to perform processing by taking it as the gray value of interest because the difference between the gray value difference and the threshold value is calculated in the one previous processing.

At S706, whether or not the gray value difference that needs to be modified exists among the gray value differences calculated from the color value list is determined. Specifically, in a case where at least one gray value difference smaller than the threshold value exists (that is, in a case where at least one gray value difference whose results of the calculation at S704 are a minus value exists), it is determined that the gray value difference that needs to be modified exists. In a case where the determination results indicate that not a single gray value difference that needs to be modified exists, the discrimination improvement processing is exited. On the other hand, in a case where at least one gray value difference that needs to be modified exists, the processing advances to S707.

At S707, the sum total of values to be widened by modification (total amount of changes) is calculated in a case where modification to widen each gray value difference smaller than the threshold value to the threshold value is performed. In the present embodiment, the total of the minus values of the values calculated at S704 is calculated. In the example in FIG. 6A described previously, the combinations of IDs whose gray value difference is less than the threshold value are the combination of ID 1 and ID 2, the combination of ID 2 and ID 3, the combination of ID 3 and ID 4, the combination of ID 4 and ID 5, and the combination of ID 5 and ID 6 and the gray value difference of each combination is "1". Then, the total amount of changes in a case where each gray value difference=1 is widened to the threshold value=16 is the absolute value of (1−16)×5=−75, and therefore, "75" is obtained.

At S708, in order to absorb the total amount of changes calculated at S707 within the number of tones (in the present embodiment, 256) that the printer engine 111 can represent, to each gray value difference larger than the threshold value, the amount of change in charge of each gray value difference among the total amount of changes is distributed. Then, at S711, to be described later, based on the amounts of change distributed at this step, the gray value corresponding to the target gray value difference is changed. Explanation is given by taking the case of FIG. 6A described previously as an example. Here, the total amount of changes necessary to change all the gray value differences smaller than the threshold value to the same value as the threshold value is "75". In this case, in order to absorb "75" within the 256 tones, at the portions of all the gray value differences larger than the threshold value, the gray value differences are reduced by "75" in total. Here, in the color value list in FIG. 6A, the combination whose gray value difference is larger than the threshold value is the combination of ID 0 and ID 1 (255−146=109) and the combination of ID 6 and ID 7 (141−0=141). Here, for example, it is possible to change the gray value difference "109" to 109−75=34 by subtracting the total amount of changes "75" from only the gray value difference "109" of the combination of ID 0 and ID 1 while maintaining the gray value difference "141" of the combination of ID 6 and ID 7 as it is. However, for example, it is said that the conversion by formula (1) described previously has an advantage of being capable of converting into grays close to the color lightness components, and in a case where the portion of the specific gray value difference alone is changed considerably, the advantage may be wasted largely. Consequently, by taking all the gray value differences exceeding the threshold value as the target, the amount of charge in charge of each gray value difference among the total amount of changes is determined in accordance with the magnitude of each gray value difference and distributed. Specifically, first, in order to guarantee that the changed gray value difference is larger than the threshold value, the value corresponding to the threshold value (here, "16") is subtracted in advance from the target gray value difference. As a result of that, the following is obtained.

$$\text{gray value difference between ID 0 and ID 1} = 109 - 16 = 93$$
$$\text{gray value difference between ID 6 and ID 7} = 141 - 16 = 125$$

Next, to each value obtained by subtracting the threshold value, the total amount of changes "75" is weighted and distributed in accordance with the magnitude of each value. As a result of that, the following is obtained.

$$\text{amount of change of gray value difference between ID 0 and ID 1} =$$
$$75 \times (93/(93 + 125)) \approx 32$$
$$\text{amount of change of gray value difference between ID 6 and ID 7} =$$
$$75 \times (128/(93 + 125)) \approx 43$$

In this manner, the total amount of changes accompanying the widening of the gray value differences, which is calculated at S707, is distributed by weighting to the gray value differences that are not widened (gray value differences not to be widened) because of being larger than the threshold value. In the specific example used in the present embodiment, the two gray value differences are larger than the threshold value, but it is also possible to perform the same calculation in a case where there are three or more gray value differences larger than the threshold value.

At S709, whether or not the gray value difference of interest among each gray value difference calculated at S703 is smaller than the threshold value is determined. In a case where the gray value difference of interest is smaller than the threshold value, the processing advances to S710, otherwise, the processing advances to S711.

At S710, the corresponding gray value is changed so that the gray value difference of interest smaller than the threshold value becomes the same value as the threshold value. Then, at S711, based on the amount of change distributed to the gray value difference of interest exceeding the threshold value, the corresponding gray value is changed. In a case of the present flowchart, for the gray value difference equal to the threshold value, the amount of change that should be in charge of the gray value difference is not distributed from the total amount of changes, and therefore, this step is skipped.

At S712, whether or not the change of the gray value for all the gray value differences calculated at S703 is completed is determined. In a case where the gray value is changed for all the calculated gray value differences being taken as the target, the discrimination improvement processing is exited. On the other hand, in a case where there remains an unprocessed gray value difference, the processing returns to S709, and the processing is continued by taking the next gray value difference of interest as the target. In the example in FIG. 6A described previously, each piece of processing after S709 advances as follows.

In the first routine, the gray value difference=109 between ID=0 and ID=1 is taken as the gray value difference of interest and a comparison with the threshold value is made, and the processing advances to S711 (NO at S709). Here, to the gray value difference of interest=109, the amount of change "32" is distributed, and therefore, the modified gray value difference is "77". In order to implement this, the gray values whose ID=0 and ID=1 are changed, but the gray value whose ID=0 is "255", which is the upper limit value, and therefore, it is not possible to change "255" in order to absorb the total amount of changes within the 256 tones. Consequently, in order to attain the modified gray value difference=77, the amount of change=32 is added to the gray value "146" whose ID=1, and therefore, the gray value "146" is changed to "178".

In the next routine, the gray value difference=1 between ID=1 and ID=2 is taken as the gray value difference of interest and a comparison is made with the threshold value, and the processing advances to S710 (YES at S709). Then, the gray value whose ID=2 is changed to "162", which is the value obtained by subtracting "16" from the changed gray value "178" whose ID=1 described above, so that the gray value difference becomes the same as the threshold value.

In the next routine, the gray value difference=1 between ID=2 and ID=3 is taken as the gray value difference of interest and a comparison is made with the threshold value, and the processing advances to S710 (YES at S709). Then, the gray value whose ID=3 is changed to "146", which is the value obtained by subtracting "16" from the changed gray value "162" whose ID=2 described above, so that the gray value difference becomes the same as the threshold value.

In the next routine, the gray value difference=1 between ID=3 and ID=4 is taken as the gray value difference of interest and a comparison is made with the threshold value 16, and the processing advances to S710 (YES at S709). Then, the gray value whose ID=4 is changed to "130", which is the value obtained by subtracting "16" from the changed gray value "146" whose ID=3 described above, so that the gray value difference becomes the same as the threshold value.

In the next routine, the gray value difference=1 between ID=4 and ID=5 is taken as the gray value difference of interest and a comparison is made with the threshold value, and the processing advances to S710 (YES at S709). Then, the gray value whose ID=5 is changed to "114", which is the value obtained by subtracting "16" from the changed gray value "130" whose ID=4 described above, so that the gray value difference becomes the same as the threshold value 16.

In the next routine, the gray value difference=1 between ID=5 and ID=6 is taken as the gray value difference of interest and a comparison is made with the threshold value, and the processing advances to S710 (YES at S709). Then, the gray value whose ID=6 is changed to "98", which is the value obtained by subtracting "16" from the changed gray value "114" whose ID=5 described above, so that the gray value difference becomes the same as the threshold value.

In the last routine, the gray value difference=141 between ID=6 and ID=7 is taken as the gray value difference of interest and a comparison is made with the threshold value, and the processing advances to S710 (YES at S709). Here, to the gray value difference of interest=141, the amount of change=43 is distributed and the modified gray value difference=98 is obtained. In order to implement this, the remaining gray value whose ID=7 is changed, but the gray value whose ID=7 is 0", which is the lower limit value of the 256 tones that can be represented. Further, at this time in point, the gray value whose ID=6 is changed to "98" and the state where the modified gray value difference=98 is implemented is brought about. Consequently the processing is exited without changing the gray value any more.

Figure 8:
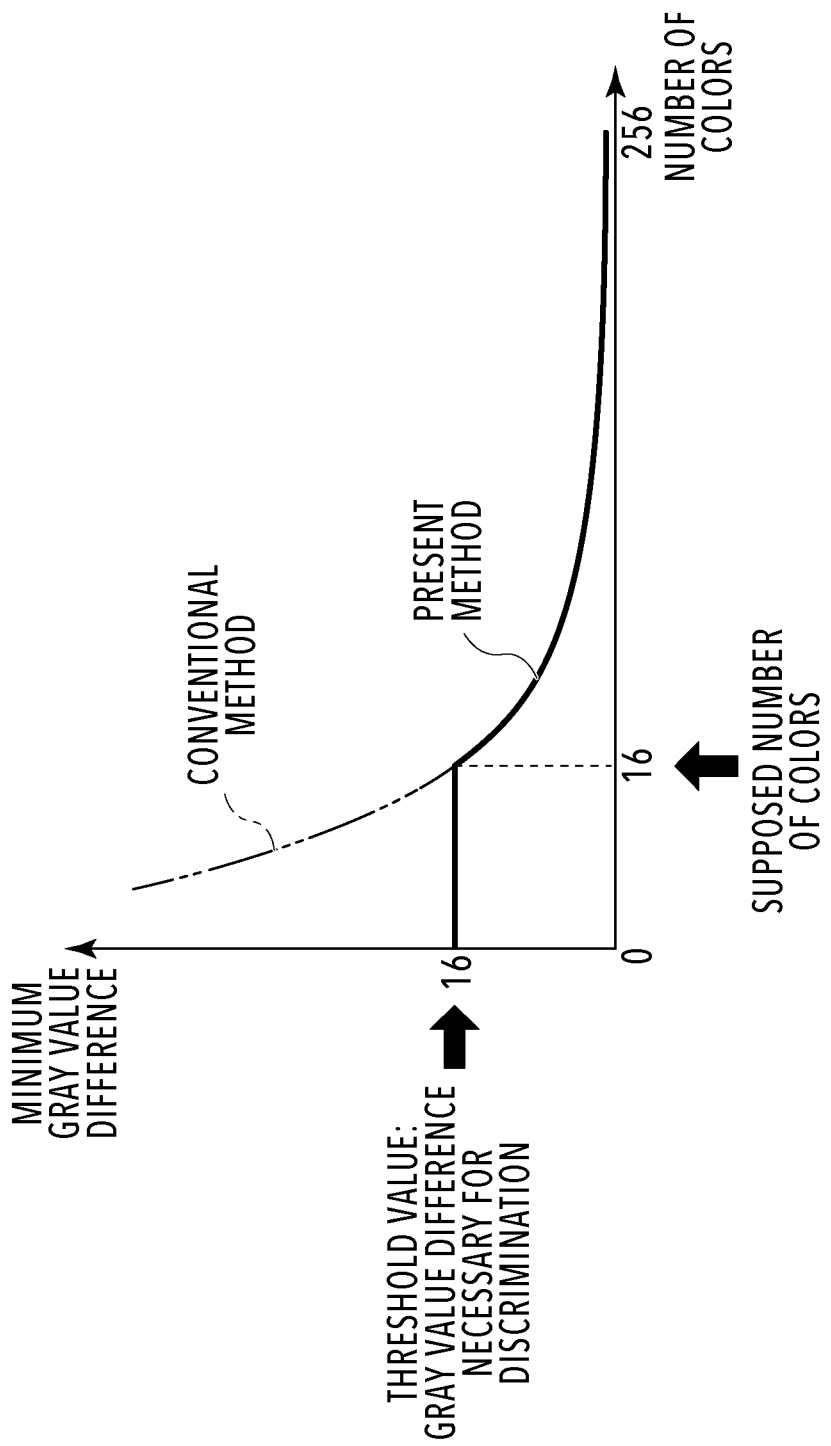
FIG. 8 is a graph explaining a difference between a conventional method and the present method.

The above is the contents of the discrimination improvement processing according to the present embodiment. As a result of the processing as described above, from the color value list in FIG. 6A, the color value list shown in FIG. 6B is obtained. For the portion at which the gray value difference is small in the gray value group included in the color value list, the gray value difference is widened to the threshold value with which discrimination is secured and it can be seen that discrimination is improved. FIG. 8 is a graph explaining the difference between the conventional method and the present method, in which the minimum gray value difference is taken along the vertical axis and the number of colors is taken along the horizontal axis. With the present method, it can be seen that the gray value difference necessary for discrimination is guaranteed in a case where the number of colors is within the supposed number of colors. Then, for the portion at which the gray value difference exceeds the threshold value, the gray value difference is reduced in accordance with the original gray value difference as shown in FIG. 6B. That is, the ratio of the gray value difference between ID=1 and ID=2 to the gray value difference between ID=6 and ID=7 before the processing is 109/141≈0.77 and that after the processing is 77/98≈0.78. That is, the ratio between the gray value differences does not change considerably before and after the discrimination improvement processing and this means that the impression given by the original color image is not changed considerably.

The color value list thus obtained is stored in the RAM 103. Then, the RIP unit 213 generates a raster image by reading the color value list from the RAM 103 and converting RGB values of each pixel into a gray value with reference to the color value list.

In the explanation described above, the discrimination improvement processing is performed in the grayscale conversion in a case where a raster image is generated by interpreting PDL in the MFP 100, but this is not limited. For example, it may also be possible to generate a print job including PDL of a grayscale image whose discrimination is improved by performing the same discrimination improvement processing within the printer driver 202 of the MFP 100 and input the print job to the MFP 100.

<Effects of Discrimination Improvement Processing>

Figure 4C:
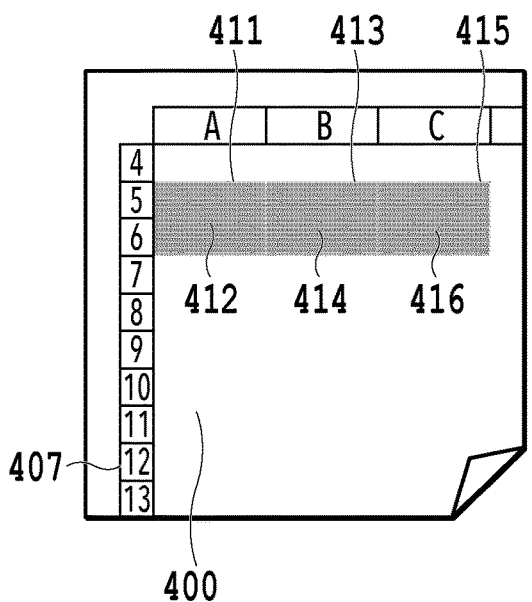
FIG. 4C and FIG. 4D are each a diagram showing one example of a grayscale image.
Figure 4D:
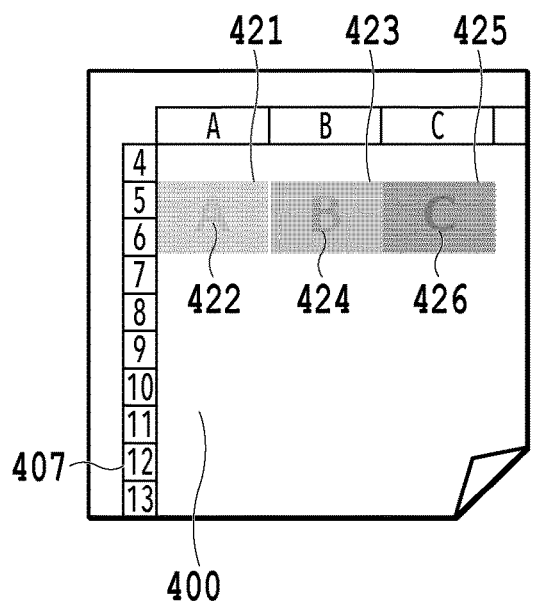
Figure 9A:
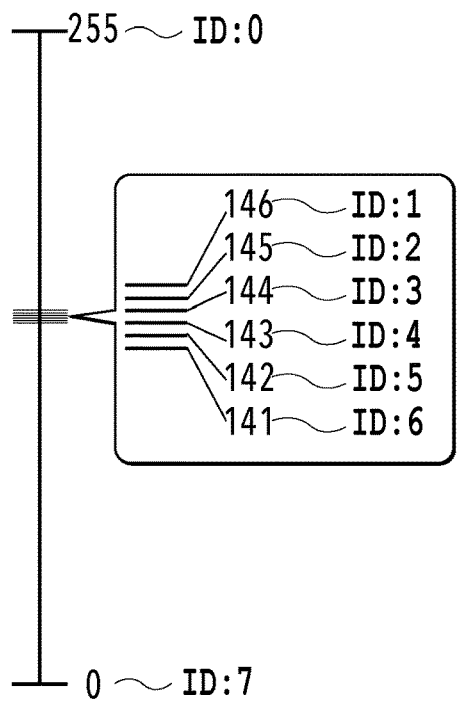
FIG. 9A to FIG. 9D are each a diagram showing gray values being plotted on a number line.
Figure 9B:
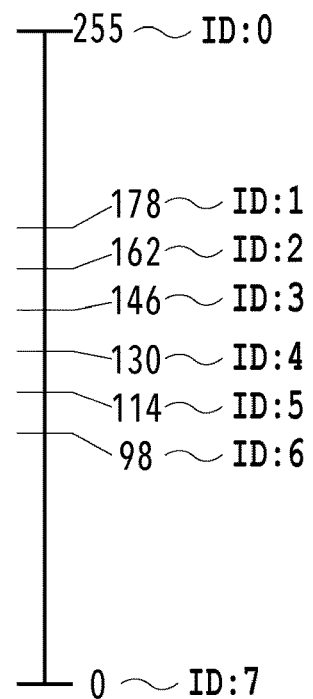

Effects of the discrimination improvement processing according to the present embodiment is explained anew. The RGB values of each of the objects 400 to 407 included in the color image shown in FIG. 4B described previously are first converted into each gray value shown in the color value list in FIG. 6A by formula (1) described previously. FIG. 9A shows each gray value of these eight objects 400 to 407 being plotted on a number line and it can be seen that the six gray values of the rectangular objects 401 to 403 and the alphabet letter objects 404 to 406 aggregate densely. FIG. 4C shows a grayscale image based on each gray value before the discrimination improvement processing and the state is such that objects 411 to 416 corresponding to the above-described six objects 401 to 406 cannot be discriminated from one another. Then, FIG. 4D shows a grayscale image based on each gray value after the discrimination improvement processing and FIG. 9B shows each of the gray values being plotted on a number line. In FIG. 9B, the adjacent gray values are separated with a distance in between and in FIG. 4D, it can be seen that objects 421 to 426 corresponding to the above-described six objects 401 to 406 are discriminated from one another.

Modification Example

With the above-described embodiment, the attempt is made to improve discrimination by making small the gray value difference larger than the threshold value and making large the gray value difference smaller than the threshold value. In a case of this method, for example, it may happen that while the gray value difference a bit larger than the threshold value is made small and approaches the threshold value, the gray value difference considerably smaller than the threshold value is made large so as to be equal to the threshold value, and therefore, both the gray value differences after the processing may be substantially the same. In this case, it may happen that the impression of the original color image is considerably different from that of the converted grayscale image. In order to avoid this, it may also be possible to exclude the gray value difference close to the threshold value among the gray value differences larger than the threshold value from the distribution target in distributing the total amount of changes at S708.

Figure 9C:
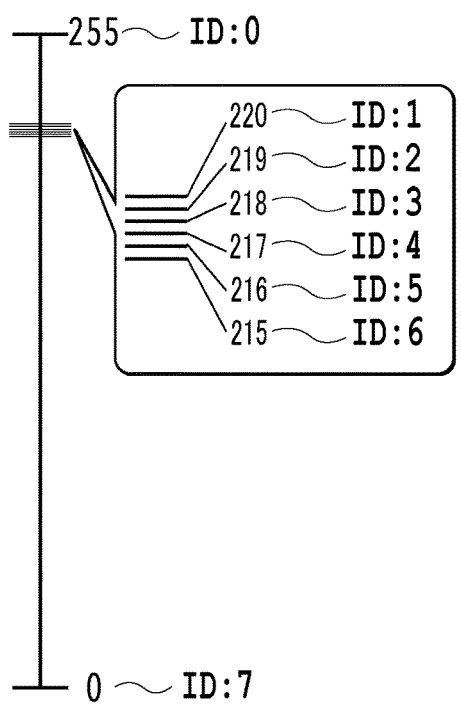
Figure 9D:
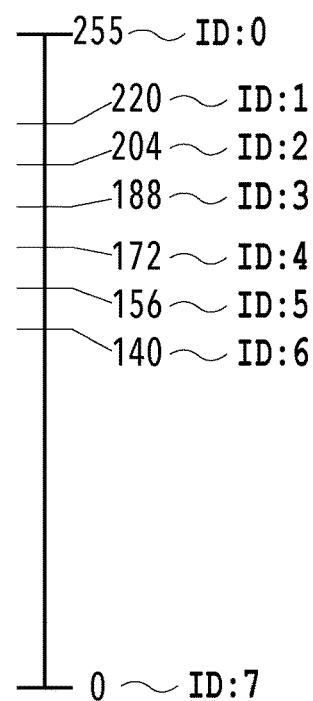

Here, as a specific example of the present modification example, a case where the gray value difference the closest to the threshold value among the gray value differences larger than the threshold value is excluded is explained by taking the color value list shown in FIG. 6C as an example. In the color value list in FIG. 6C, the gray value in each record of ID=0 to 7 is 255, 220, 219, 218, 217, 216, 215, and 0, respectively. Then, FIG. 9C shows these gray values being plotted on a number line. Here, in a case where the threshold value is taken to be 16 (threshold value=16), the combinations whose gray value difference is larger than the threshold value are the combination of ID=0 and ID=1 and the combination of ID=6 and ID=7 and each gray value difference is 255−220=35 and 215−0=215. In this state, in a case where part of the total amount of changes is distributed to the gray value difference "35" by the method of the above-described embodiment, the modified gray value difference becomes close to "16". Consequently, the gray value difference "35" is excluded from the distribution target. That is, the total amount of changes is distributed only to the gray value difference "215". Here, the total amount of changes in a case where the gray value difference=1 smaller than the threshold value is widened to the threshold value=16 is the absolute value of (1−16)×5=−75, that is, "75", and therefore, 215−75=140 results. The total amount of changes "75" is distributed only to the gray value difference "215". As a result of that, the color value list as shown in FIG. 6D is obtained, in which the gray value in each record of ID=0 to 7 is changed to 255, 220, 204, 188, 172, 156, and 140, respectively. FIG. 9D shows those gray values being plotted on a number line. As is obvious from FIG. 6D and FIG. 9D, the gray value difference of the combination of ID=0 and ID=1 is maintained without being changed, and therefore, it is possible to discriminate the gray value differences widened to the threshold value from one another, and as a result of this, it is possible to keep the impression of the original color image.

In the present modification example, the case is explained where only the one minimum gray value difference among the gray value differences larger than the threshold value is excluded, but this is not limited and it may also be possible to exclude a plurality of gray value difference including the minimum gray value difference. Further, it may also be possible to exclude the gray value difference in a specific area, such as the highlight area and the dark area within the target image. Furthermore, it may also be possible to exclude the two gray value differences the closest to both ends (in a case of 256 tones, "0" and "255") in the number of tones that can be represented.

As above, according to the present embodiment, the gray value difference (threshold value) that can be discriminated is defined in advance. Then, for a plurality of gray values obtained by the general grayscale conversion, for the portion at which the difference between the adjacent gray values is smaller than the threshold value, the difference is widened to the threshold value, and for the portion at which the difference is larger than the threshold value, the difference is made small in accordance with the magnitude of the difference. Due to this, the gray value difference is suppressed from becoming extremely small, and therefore, it is made possible to obtain a grayscale image whose discrimination is improved without changing the impression from that of the original color image considerably.

Second Embodiment

Depending on the printing characteristics of the image forming apparatus and the type of the printing sheet, there is a case where gradation is unlikely to appear in the dark area and the highlight area within the target image and it is more difficult to secure discrimination. Consequently, an aspect is explained as a second embodiment, in which processing to widen the gray value difference to the threshold value in the discrimination improvement processing is made more likely to be applied to a specific area (in the following, called "specific density area") within an image, in which it is difficult to secure discrimination empirically. Explanation of the contents common to those of the first embodiment is omitted and in the following, points different from those of the first embodiment are explained mainly.

<Discrimination Improvement Processing>

Figure 10A:
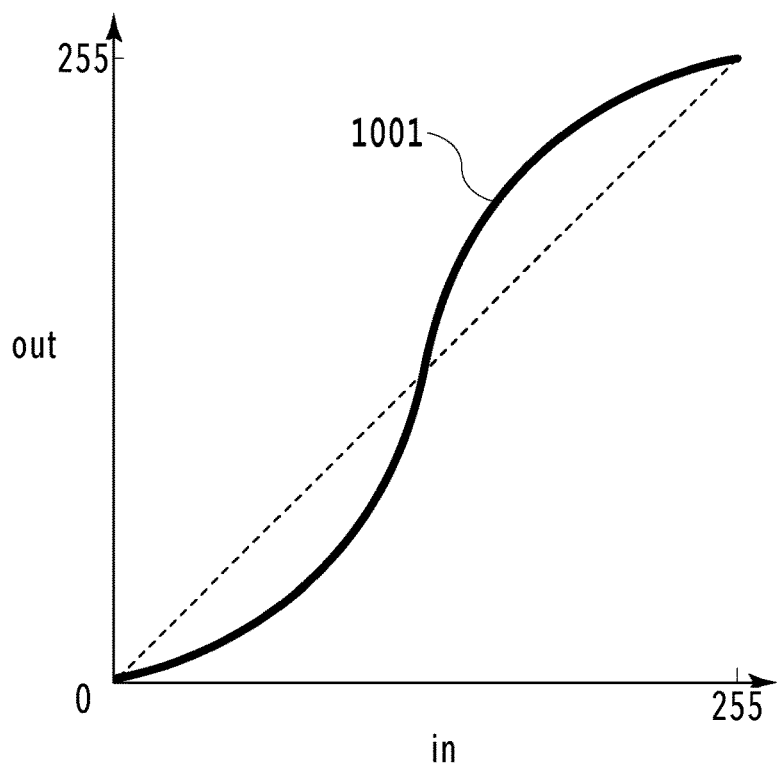
FIG. 10A and FIG. 10B are each a diagram showing one example of an LUT.

In the discrimination improvement processing according to the present embodiment, before the gray value difference calculation processing (S703), conversion processing is performed for each gray value stored in the color value list so that the gray value difference is reduced in the specific density area. For this conversion, for example, an LUT (in the following, called "reducing LUT") having conversion characteristics reducing the gray value difference in the specific density area is used. Then, the gray value difference calculation processing (S703) is performed based on the converted gray values obtained by the conversion processing using the reducing LUT. FIG. 10A is one example of the reducing LUT in a case where the output gray value is taken along the vertical axis and the input gray value is taken along the horizontal axis and the characteristics of the reducing LUT are represented by an S-letter as indicated by a solid line 1001. By the conversion using the reducing LUT having the characteristics shown in FIG. 10A, the difference between the gray value of the pixel belonging to the dark area and the gray value of the pixel belonging to the highlight area becomes small compared to that in a case where the LUT conversion processing is not performed. As a result of that, it becomes more likely to be determined that the gray value difference needs to be widened and in a case where the gray value difference is actually smaller than the threshold value (NO at S709), the processing to widen the gray value difference to the threshold value is applied (S710). Further, even in a case where the gray value difference becomes larger than or equal to the threshold value, the gray value difference is small compared to that before the above-described LUT conversion processing is performed, and therefore, it is possible to reduce the amount of modification in weighting and distributing the total amount of changes (S708). That is, it is possible to prevent the gray value difference in the specific density area in which discrimination is poor from becoming extremely small.

Figure 10B:
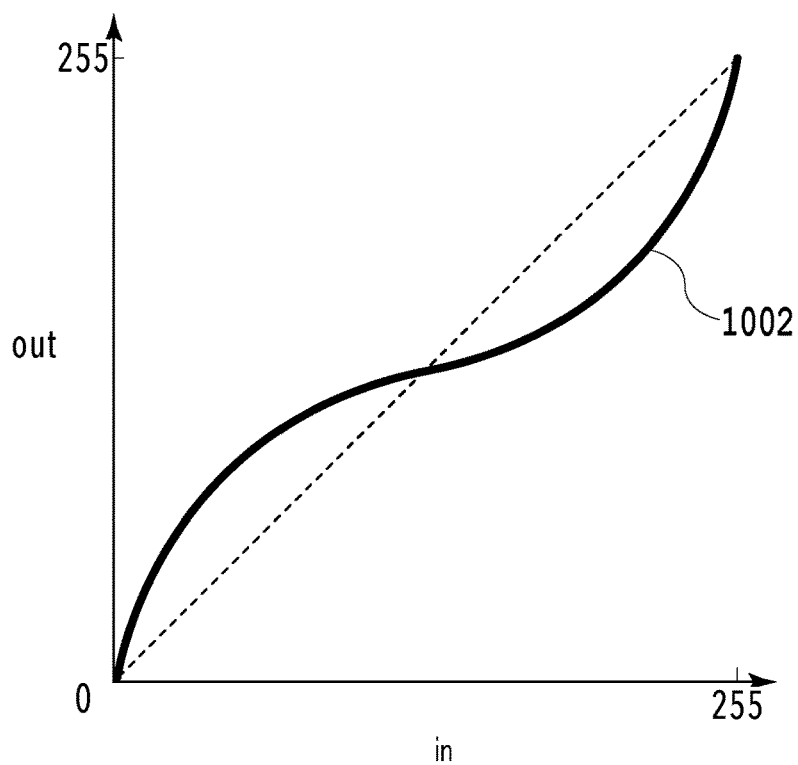

Then, for each gray value after the gray value difference modification processing (S710 and S711) is performed, conversion processing is performed so that the gray value difference is widened in the specific density area. For this conversion, an LUT (in the following, called "widening LUT") having conversion characteristics widening the gray value difference in the specific area is used. FIG. 10B is one example of the widening LUT in a case where the output gray value is taken along the vertical axis and the input gray value is taken along the horizontal axis and the characteristics are represented by an S-letter as indicated by a solid line 1002. That is, the widening LUT is an LUT having the characteristics opposite to those of the reducing LUT. After performing the processing to widen the gray value difference smaller than the threshold value to the threshold value as described above, by performing conversion using the widening LUT having the characteristic opposite to those of the reducing LUT having been applied previously, it is possible to further widen the gray value difference in the specific density area.

The above is the contents of the discrimination improvement processing according to the present embodiment. According to the present embodiment, it is also possible to improve discrimination in the dark area and the highlight area in which it is difficult to secure discrimination depending on the printing characteristics of the printer and the sheet type.

In the present embodiment, the characteristics of the LUT to be used are represented by the shape of an S-letter, but this is not limited. For example, in a case where the portion at which gradation is poor is only in the highlight area, it may also be possible to apply a reducing LUT having characteristics in the shape of an upward convex in the LUT conversion in the previous stage so as to correspond to the highlight area and apply a widening LUT having the opposite characteristics in the LUT conversion in the subsequent stage.

Modification Example

In the present embodiment, an LUT is used for the conversion of the gray value in the specific density area, but the present embodiment is not limited to this and for example, it may also be possible to perform conversion by computing processing using a function in place of an LUT. Further, it may also be possible to apply a larger threshold value only to a specific tone range, such as a dark area (for example, 0 to 50) or a highlight area (200 to 255), of the tones (in a case of 256 tones, 0 (black) to 255 (white)) of the gray values that can be represented. Due to this, the gray value difference becomes larger in the dark area and the highlight area. As above, by setting a different threshold value to a specific tone range of the tones of the gray values that can be represented, it is also possible to obtain the same effects.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to obtain a grayscale image in which discrimination is improved without changing the impression from that of an original color image considerably.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-003732, filed Jan. 13, 2023 which is hereby incorporated by reference wherein in its entirety.

What is claimed is:

1. An image processing apparatus for printing a color image in monochrome, the image processing apparatus comprising:
   a memory that stores instructions; and
   a processor that causes, by executing the instructions, the image processing apparatus to function as:
   a conversion unit configured to convert a multidimensional color component value identifying a color included in the color image into a gray value; and
   a modification unit configured to modify the gray value obtained by the conversion unit, wherein
   in a case where a plurality of colors is included in the color image, the modification unit:
      calculates a gray value difference indicating a difference between two adjacent gray values for a plurality of the gray values corresponding to the plurality of colors and arranged in order from the largest gray value;
      in a case where the calculated gray value difference is smaller than a threshold value, changes the corresponding gray value so that the gray value difference becomes the same value as the threshold value; and
      in a case where the calculated gray value difference is larger than the threshold value, changes the corresponding gray value so that the gray value difference becomes small in accordance with the magnitude of the gray value difference,
   wherein the modification unit:
      distributes a total amount of changes relating to a gray value difference smaller than the threshold value in a case where a corresponding gray value is changed so that the gray value difference becomes the same value as the threshold value to a gray value difference larger than the threshold value in accordance with the magnitude of the gray value difference, and
      changes a corresponding gray value so that a gray value difference larger than the threshold value becomes small by an amount corresponding to an amount of change distributed respectively.

2. The image processing apparatus according to claim 1, wherein
   the threshold value is set based on a supposed number of colors in the color image.

3. The image processing apparatus according to claim 2, wherein
   the threshold value is changed to a value smaller than a value that is set premised on the supposed number of colors in a case where the number of colors in the color image is larger than the supposed number of colors.

4. The image processing apparatus according to claim 2, wherein
   the supposed number of colors is found by a formula below $$\text{supposed number of colors} = (\text{number of tones that can be represented}/\text{threshold value}) + 1.$$

5. The image processing apparatus according to claim 3, wherein
   the threshold value is changed by using a formula below $$\text{changed threshold value} = \text{number of tones that can be represented}/(\text{number of colors of the color image} - 1).$$

6. The image processing apparatus according to claim 1, wherein
   the modification unit excludes a specific gray value difference among the gray value differences larger than the threshold value from a target of the distribution.

7. The image processing apparatus according to claim 6, wherein
   The specific gray value difference is a minimum gray value difference among the gray value differences larger than the threshold value.

8. The image processing apparatus according to claim 7, wherein
   the specific gray value difference is a plurality of gray value differences including the minimum gray value difference.

9. The image processing apparatus according to claim 1, wherein
   the specific gray value difference is a gray value difference in a specific area in the color image.

10. The image processing apparatus according to claim 9, wherein
    the specific area is a highlight area or a dark area.

11. The image processing apparatus according to claim 1, wherein
    the modification unit:
       performs the modification after performing processing to reduce a gray value difference for a gray value in a specific density area in the color image among gray values obtained by the conversion unit; and performs processing to widen a gray value difference for the gray value for which the modification of the specific density area has been performed.

12. The image processing apparatus according to claim 11, wherein
the modification unit performs the reducing processing and the widening processing by using a lookup table and
a lookup table used for the reducing processing and a lookup table used for the widening processing have characteristics opposite to each other.

13. The image processing apparatus according to claim 1, wherein
the modification unit applies a threshold value larger than the threshold value only to a specific tone range of the number of tones of gray values that can be represented.

14. The image processing apparatus according to claim 1, wherein
the conversion unit performs the conversion by one method of NTSC weighted average, sRGB, and RGB uniform.

15. An image processing method for printing a color image in monochrome, the image processing method comprising the steps of:
converting a multidimensional color component value identifying a color included in the color image into a gray value; and
modifying the gray value obtained in the converting, wherein
in a case where a plurality of colors is included in the color image, in the modifying:
a gray value difference indicating a difference between two adjacent gray values is calculated for a plurality of the gray values corresponding to the plurality of colors and arranged in order from the largest gray value;
in a case where the calculated gray value difference is smaller than a threshold value, the corresponding gray value is changed so that the gray value difference becomes the same value as the threshold value; and
in a case where the calculated gray value difference is larger than the threshold value, the corresponding gray value is changed so that the gray value difference becomes small in accordance with the magnitude of the gray value difference,
wherein a total amount of changes relating to a gray value difference smaller than the threshold value is distributed in a case where a corresponding gray value is changed so that the gray value difference becomes the same value as the threshold value to a gray value difference larger than the threshold value in accordance with the magnitude of the gray value difference, and
a corresponding gray value is changed so that a gray value difference larger than the threshold value becomes small by an amount corresponding to an amount of change distributed respectively.

16. A non-transitory computer readable storage medium storing a program for causing a computer to perform an image processing method for printing a color image in monochrome, the image processing method comprising the steps of:
converting a multidimensional color component value identifying a color included in the color image into a gray value; and
modifying the gray value obtained in the converting, wherein
in a case where a plurality of colors is included in the color image, in the modifying:
a gray value difference indicating a difference between two adjacent gray values is calculated for a plurality of the gray values corresponding to the plurality of colors and arranged in order from the largest gray value;
in a case where the calculated gray value difference is smaller than a threshold value, the corresponding gray value is changed so that the gray value difference becomes the same value as the threshold value; and
in a case where the calculated gray value difference is larger than the threshold value, the corresponding gray value is changed so that the gray value difference becomes small in accordance with the magnitude of the gray value difference,
wherein a total amount of changes relating to a gray value difference smaller than the threshold value is distributed in a case where a corresponding gray value is changed so that the gray value difference becomes the same value as the threshold value to a gray value difference larger than the threshold value in accordance with the magnitude of the gray value difference, and
a corresponding gray value is changed so that a gray value difference larger than the threshold value becomes small by an amount corresponding to an amount of change distributed respectively.

\* \* \* \* \*